(12) United States Patent
Lee

(10) Patent No.: US 12,309,038 B2
(45) Date of Patent: May 20, 2025

(54) NETWORK DATA ANALYSIS METHOD AND SYSTEM BASED ON FEDERATED LEARNING

(71) Applicant: ELECTRONICS AND TELECOMMUNICATIONS RESEARCH INSTITUTE, Daejeon (KR)

(72) Inventor: Soohwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 48 days.

(21) Appl. No.: 18/313,205

(22) Filed: May 5, 2023

(65) Prior Publication Data

US 2024/0080245 A1   Mar. 7, 2024

(30) Foreign Application Priority Data

| May 6, 2022 | (KR) | ......................... 10-2022-0056162 |
| May 20, 2022 | (KR) | ......................... 10-2022-0062175 |
| Nov. 4, 2022 | (KR) | ......................... 10-2022-0146516 |
| Jan. 9, 2023 | (KR) | ......................... 10-2023-0002928 |
| May 3, 2023 | (KR) | ......................... 10-2023-0057978 |

(51) Int. Cl.
*H04L 41/14* (2022.01)
*H04L 41/16* (2022.01)

(52) U.S. Cl.
CPC ............ *H04L 41/145* (2013.01); *H04L 41/16* (2013.01)

(58) Field of Classification Search
None
See application file for complete search history.

(56) References Cited

U.S. PATENT DOCUMENTS

| 8,181,195 B2 | 5/2012 | Sardera |
| 2021/0144076 A1 | 5/2021 | Lee et al. |
| 2021/0226860 A1 | 7/2021 | Lee et al. |
| 2023/0083982 A1* | 3/2023 | Xin ...................... H04L 41/145 709/223 |
| 2023/0262433 A1* | 8/2023 | Potluri .................. H04W 48/16 455/414.3 |
| 2024/0073709 A1* | 2/2024 | Karampatsis ......... H04W 24/02 |
| 2024/0232708 A1* | 7/2024 | Karampatsis .......... G06N 20/00 |

* cited by examiner

*Primary Examiner* — Fadi Haj Said

(57) ABSTRACT

A federated learning-based network data analysis method and an apparatus for performing the same are provided. An operating method of a federation learning (FL) server includes performing an FL operation trigger in response to a request of a first network function (NF), selecting a plurality of second NFs on an analytics identifier (ID) in response to the FL operation trigger, and requesting the plurality of second FLs for FL, wherein the first NF is an FL consumer, and the plurality of second NFs is an FL client.

18 Claims, 9 Drawing Sheets

NETWORK DATA ANALYSIS METHOD AND SYSTEM BASED ON FEDERATED LEARNING

1. FIELD OF THE INVENTION

The following disclosure relates to a federated learning-based network data analysis method and an apparatus for performing the same.

2. DESCRIPTION OF THE RELATED ART

To support network automation, a fifth generation (5G) telecommunication system defines a network data analytics function (NWDAF) that is a network function for providing a function to analyze data collected by the 5G network.

For automation and optimization of the 5G telecommunication system, the NWDAF may collect raw data of each network function and application function, may convert the raw data into big data, and may provide network analytics information by processing the big data.

The above description is information the inventor(s) acquired during the course of conceiving the present disclosure, or already possessed at the time, and is not necessarily art publicly known before the present application was filed.

SUMMARY

Example embodiments provide a method of supporting a federated learning (FL) procedure between different network data analytics functions (NWDAFs).

However, the technical aspects are not limited to the aforementioned aspects, and other technical aspects may be present.

According to an aspect, there is provided an operating method of a federated learning server, the method includes performing an FL operation trigger in response to a request of a first network function (NF), selecting a plurality of second NFs on an analytics identifier (ID) in response to the FL operation trigger, and requesting the plurality of second FLs for FL, wherein the first NF is an FL consumer, and the plurality of second NFs is an FL client.

The FL server and the plurality of second NFs include an FL capability, and the FL capability indicates that at least one of an FL server capability and an FL client capability is supported for a corresponding analytics ID.

When the first NF is a network data analytics function (NWDAF) including a model training logical function (MTLF), a request of the first NF is performed as an Nnwdaf_MLModelTraining_Subscribe service, and when the first NF is an NWDAF including an analytic logical function (AnLF), a request of the first NF is performed as an Nnwdaf_MLModelProvision_Subscribe service.

The requesting for FL includes transmitting, to the plurality of NFs, second FL parameters, which are different from first FL parameters, by the FL server including the first FL parameters.

The first FL parameters include a number of FL rounds, a total number of FL clients used in a process, and an area of interest for an analytics ID.

The second FL parameters include a machine learning (ML) identifier, an indication for enabling local training, or ML model information for requesting an ML model operation.

Different ML IDs are assigned to the plurality of second NFs, respectively.

The method further includes aggregating trained interim ML models from the plurality of second NFs in response to the FL request.

The interim ML models are identified by an analytics ID and ML IDs respectively assigned to the plurality of second NFs.

The method further includes determining whether an FL operation is required based on an area of interest, ML model reporting information, an expiry time, and a local operator configuration.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
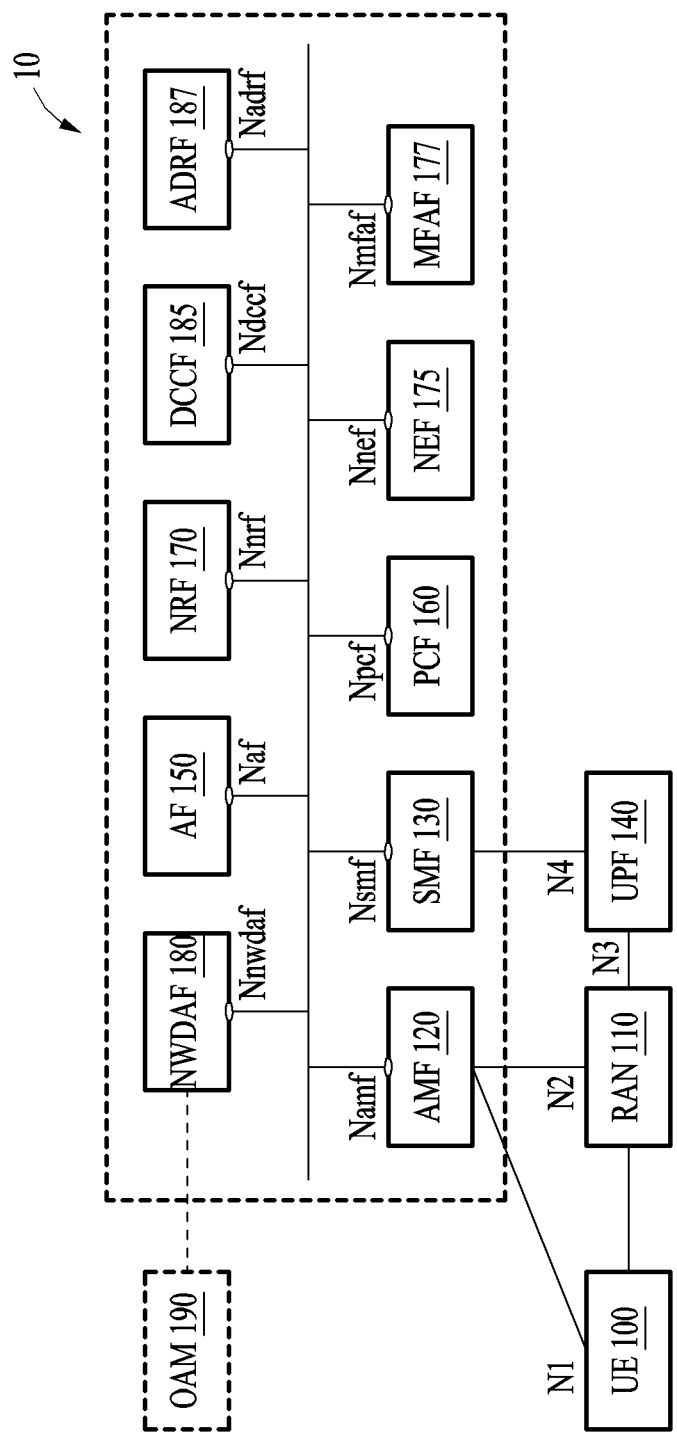
FIG. 1 is a diagram illustrating a network system according to one embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

The term "unit" or the like used herein may refer to a software or hardware component, such as a field-programmable gate array (FPGA) or an application-specific integrated circuit (ASIC), and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the examples with reference to the accompanying drawings, like reference numerals refer to like components and a repeated description related thereto will be omitted.

Terms used herein to identify a connection node, to indicate network entities, to indicate messages, to indicate an interface among network entities, to indicate various pieces of identification information are examples for ease of description. Thus, terms are not limited to terms described later in this disclosure and other terms referring to a subject having the equivalent technical meaning may be used.

Herein, for ease of description, of the currently existing communication standards, terms and names defined by long-term evolution (LTE) and new radio (NR) standards, which are the latest standards defined by the third generation partnership project (3GPP) association, are used. However, embodiments described hereinafter are not limited to the terms and names and a system in compliance with other standards may be applicable in the same manner.

FIG. 1 is a diagram illustrating a network system according to one embodiment.

Referring to FIG. 1, according to one embodiment, a network system 10 (e.g., a 5G network system) may include a plurality of entities 100 to 190. User equipment (UE) (or a user terminal) 100 may be connected to a 5G core network via a radio access network (RAN) 110. The RAN 110 may be a base station providing a wireless communication function to the UE 100. An operation, administration, and maintenance (OAM) 190 may be a system for managing a terminal and a network.

A unit in which each function provided by the network system 10 may be defined as a network function (NF). The NF may include an access and mobility management function (AMF) 120, a session management function (SMF) 130, a user plane function (UPF) 140, an application function (AF) 150, a policy control function (PCF) 160, a network repository function (NRF) 170, a network exposure function (NEF) 175, a messaging framework adapter function (MFAF) 177, a network data analytics function (NWDAF) 180, a data collection coordination function (DCCF) 185, and an analytics data repository function (ADRF) 187. The AMF 120 may manage network access and mobility of a terminal, the SMF 130 may perform a function associated with a session, the UPF 140 may transmit user data, and AF 150 may communicate with 5G core (5GC) to provide an application service. The PCF 160 may manage a policy, the NRF 170 may store status information of an NF and may process a request to find an NF accessible by other NFs.

The NWDAF 180 may provide an analytics result by analyzing data collected in a network (e.g., a 5G network) to support network automation. The NWDAF 180 may collect, store, and analyze information from the network. The NWDAF 180 may collect information from the OAM 190, an NF constituting the network, UE, or the AF 150. The NWDAF 180 may provide an analytics result to an unspecified NF, OAM, UE, or AF. The analytics result may be independently used by each NF, OAM, UE, or AF.

Figure 2:
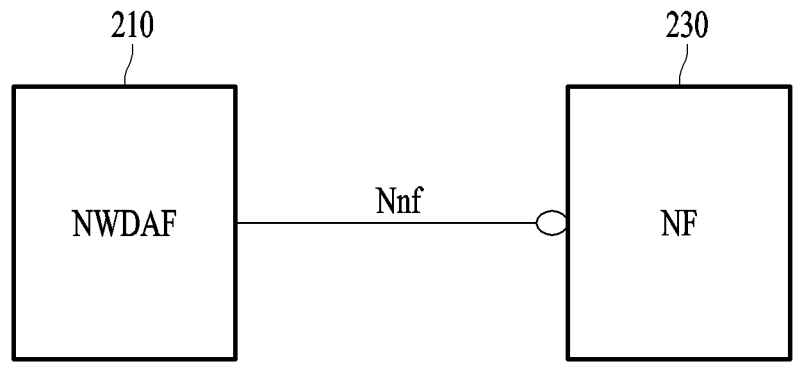
FIG. 2 is a diagram illustrating a network data analytics process according to one embodiment.

FIG. 2 is a diagram illustrating a network data analytics process according to one embodiment.

An NWDAF 210 may provide an analytics information subscription service (Nnwdaf_AnalyticsSubscription service) to an NF 230. The analytics information subscription service may allow to subscribe to or unsubscribe from a network data analytics result generated by the NWDAF 210. The analytics information subscription service may be divided into periodically receiving a network analytics result according to the needs of a network function of the NF 230 that subscribes to the service and receiving an analytics result when a predetermined condition is satisfied. The analytics information subscription service may be provided through three operations of subscribing, unsubscribing, and notifying.

The subscription operation (Nnwdaf_AnlayticsSubscription_Subscribe operation) may include a required input and/or an optional input. The required input may include a single network slice selection assistance information (S-NS- SAI), an event identifier (ID) or an analytics ID, a notification target address, and an event reporting information. The optional input may include information additionally required for analytics information processing. For example, the optional input may include information of an event filter or an analytics filter (or an analytics information filter). However, the example is not limited thereto.

In the case of subscription cancellation operation (Nnwdaf_AnlayticsSubscription_Unsubscribe operation), the NF 230 may transmit subscription ID information to the NWDAF 180 and the NWDAF 210 may transmit a message notifying confirmation of subscription cancellation to the NF 230 requesting subscription cancellation as an output.

The notification operation (Nnwdaf_AnlayticsSubscription_Notify operation) may be that the NWDAF 210 notifies the NF 230, which successfully subscribes to the analytics information subscription service, of a specified network data analytics result periodically or when a predetermined condition is satisfied. The notification operation may include an event ID or an analytics ID (or analytics information ID) and a notification target address.

The NWDAF 210 may provide an analytics information request service to the NF 230. Unlike the analytics information subscription service, the analytics information request service may be a service in which the NF 230 requests analytics on predetermined information and receives a result value as soon as the request is completed. An operation of the analytics information request service may include a request and a response. The NF 230 requesting the analytics information may transmit an analytics information request message to the NWDAF 180.

The NWDAF 210 may transmit an analytics result to the NF 230 that requested. The analytics result may be used to optimize the performance of an operation (or a network function) (e.g., quality of service (QoS) management, traffic control, mobility management, load balancing, and power management of a terminal) performed by the NF 230.

The NF 230 (e.g., the UE 100, the RAN 110, the AMF 120, the SMF 130, the UPF 140, the AF 150, the PCF 160, the NRF 170, the NEF 175, the MFAF 177, the DCCF 185, the ADRF 187, and/or the OAM 190 of FIG. 1) may be a consumer NF (or a user NF) that requests an analytics result from the NWDAF 210. The NF 230 may be a service consumer NF of the network data analytics service. The NWDAF 210 may collect data from the NF 230 and analyze the data to generate the analytics result requested by the consumer NF. The NWDAF 210 may transmit the analytics result to the consumer NF that transmitted the analytics request. Accordingly, the NWDAF 210 may be a provider NF of the analytics result requested by the consumer NF. The NWDAF 210 may be a service provider NF of a service that provides an analytics result requested by a service consumer NF.

The NWDAF 210 may include at least one of an analytics logical function (AnLF) and a model training logical function (MTLF). The NWDAF 210 may include both an MTLF and an AnLF, or may support both.

An NWDAF (e.g., the NWDAF 210) including an AnLF may perform inference and may derive analytics information (e.g., derive statistics and/or predictions in response to an analytics consumer request). The NWDAF including the AnLF may expose a network data analytics service (e.g., Nnwdaf_AnalyticsSubscription or Nnwdaf_AnalyticsInfo).

An NWDAF (e.g., the NWDAF 210) including an MTLF may train a machine learning (ML) model and may expose a new training service (e.g., either provide an initial version that is not trained, or a trained model).

A combination of an interoperability indicator and an analytics ID, which is able to indicate an interoperable MTLF, of the NWDAF may be set to the NWDAF including the AnLF or the MTLF to search for a trained ML model. The NWDAF including the AnLF may search for an NWDAF including the MTLF through an NRF using the interoperability indicator, an analytics ID, a required ML model provisioning service and a training service, and/or an ML model ID.

The NWDAF including the MTLF in addition to the federated learning (FL) capability may search and select an NWDAF including an MTLF for FL. The NWDAF including the MTLF may perform local training and global training in FL. The NWDAF including the AnLF may perform local training in FL.

When the NWDAF including the MTLF may be available to provide an ML model for an analytics ID and train, the NWDAF including the MTLF may register (e.g., register to the NRF) an ML model provisioning service and a training service (e.g., Nnwdaf_MLModelProvision, Nnwdaf_MLModelInfo, Nnwdaf_MLModelUpdate, Nnwdaf_MLModelTraining, and Nnwdaf_MLModelTrainingInfo).

Figure 3:
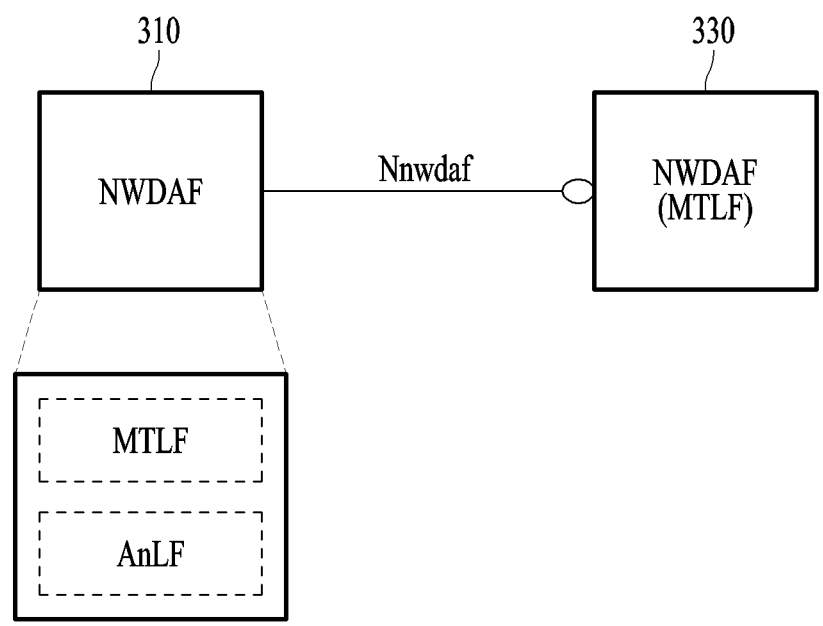
FIG. 3 is a diagram illustrating an operation of a network data analytics function (NWDAF) according to one embodiment.

FIG. 3 is a diagram illustrating an operation of an NWDAF according to one embodiment.

An NWDAF 310 may use a provisioning service task and a training service task for a trained ML model or an initial ML model that is not trained in an NWDAF 330. The NWDAF 310 may include at least one of an AnLF and an MTLF and the NWDAF 330 may include an MTLF.

The AnLF may perform inference, may derive (e.g., derive statistics and/or predictions in response to an analytics consumer request) analytics information, and may expose an analytics service (e.g., Nnwdaf_AnalyticsSubscription or Nnwdaf_AnalyticsInfo). The MTLF may train an ML model and may expose a new training service (e.g., provide a trained ML model and train an ML model).

The AnLF may support a data analytics information service (e.g., Nnwdaf_AnalyticsInfo) or an analytics subscription service (e.g., Nnwdaf_AnalyticsSubscription). The MTLF may support an ML model provisioning service (e.g., Nnwdaf_MLModelProvision), an ML model information request service (e.g., Nnwdaf_MLModelInfo), an ML model training service (e.g., Nnwdaf_MLModelTraining), and an ML model training information request service (e.g., Nnwdaf_MLModelTrainingInfo).

An Nnwdaf interface may be used to request and subscribe to the ML model provisioning service wherein the ML model may be a trained ML model or an initial version that is not trained. The Nnwdaf interface may be used to request and subscribe to the ML model training service for ML model training and FL.

Figure 4:
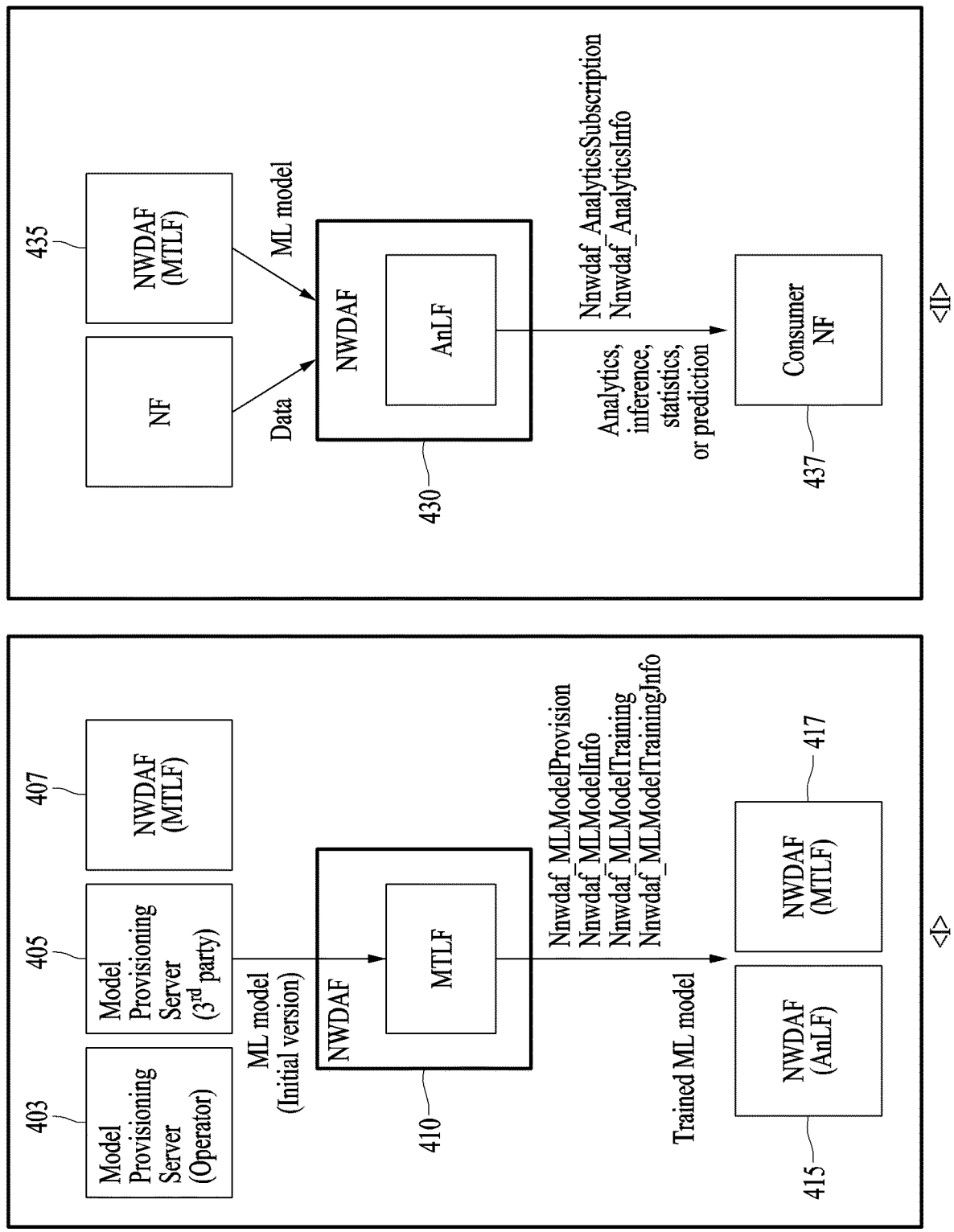
FIG. 4 is a diagram illustrating a structure of an NWDAF according to one embodiment.

FIG. 4 is a diagram illustrating a structure of an NWDAF according to one embodiment.

A description of an operation of an NWDAF 410 including an MTLF is provided with reference to I of FIG. 4. The NWDAF 410 may receive an initial version of an ML model from a model provisioning server (operator) 403, a model provisioning server (third party) 405, or an NWDAF 407 including an MTLF. After the NWDAF 410 trains the initial version of ML model, the NWDAF 410 may provide a trained ML model to an NWDAF 415 including an AnLF or an NWDAF 417 including an MTLF through an ML model provisioning service (e.g., an Nnwdaf_MLModelProvision service) or an ML model information service (e.g., an Nnwdaf_MLModelInfo service). In addition, to update an ML model, the NWDAF 410 may use an Nnwdaf_MLModelTraining service or an Nnwdaf_MLModelTrainingInfo service.

A description of an operation of an NWDAF 430 including an AnLF is provided with reference to II of FIG. 4. The NWDAF 430 may collect data from a DCCF apparatus and/or a data source (e.g., an NF or an ADRF). The NWDAF 430 may receive an ML model from an NWDAF 435 including an MTLF. The NWDAF 430 may analyze collected data using an ML model. The NWDAF 430 may provide an analytics result of the data in the form of statistics or prediction to a consumer NF apparatus 437.

Figure 5:
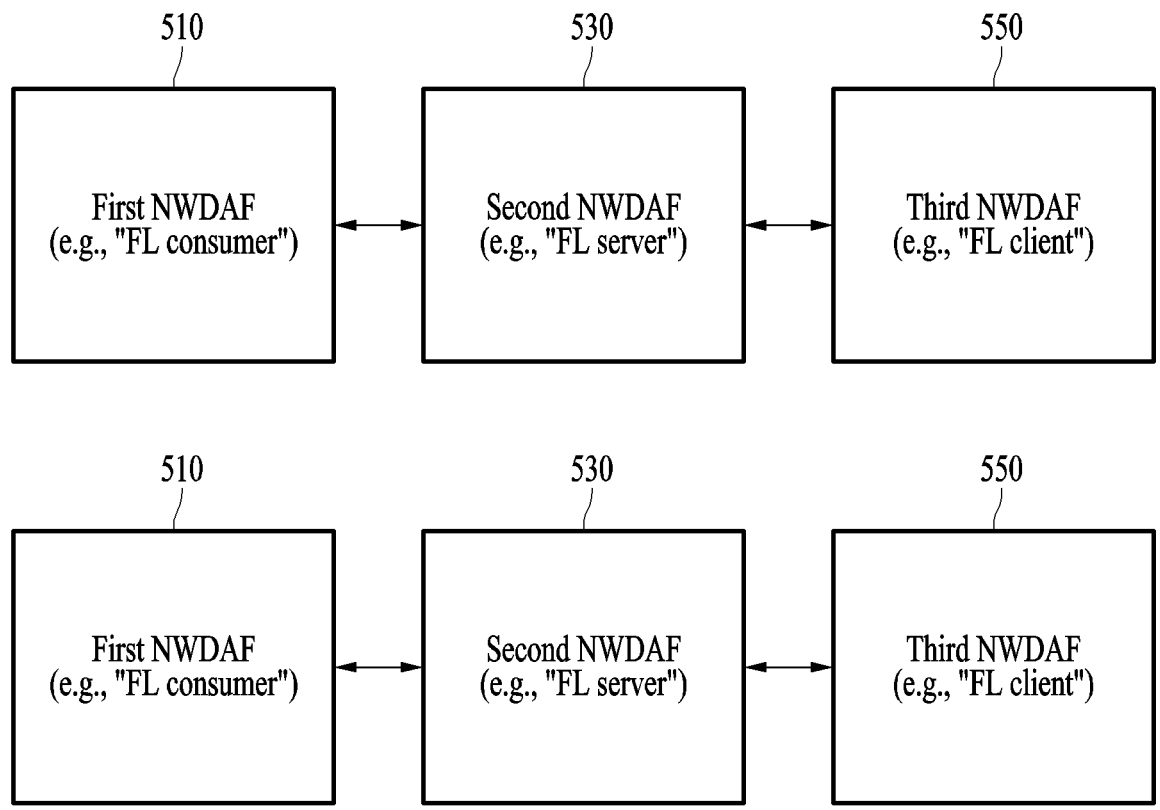
FIG. 5 is a diagram illustrating federated learning (FL) between different NWDAFs according to one embodiment.

FIG. 5 is a diagram illustrating federated learning (FL) between different NWDAFs according to one embodiment.

A first NWDAF 510 to a third NWDAF 550 may be different NWDAFs. The first NWDAF 510 may be an NWDAF including an AnLF or an NWDAF including an MTLF (e.g., an MTLF without an "FL server" capability). The second NWDAF 530 may be an NWDAF including an MTLF. The third NWDAF 550 may be an NWDAF including an MTLF.

The first NWDAF 510 to the third NWDAF 550 may perform FL. For FL, a service of Table 1 may be supported for the first NWDAF 510 to the third NWDAF 550. For example, the first NWDAF 510 to the third NWDAF 550 may perform FL using a service, such as an ML model provisioning service (e.g., Nnwdaf_MLModelProvision), an ML model information request service (e.g., Nnwdaf_MLModelInfo), an ML model training service (e.g., Nnwdaf_MLModelTraining), and an ML model training information request service (e.g., Nnwdaf_MLModelTrainingInfo).

TABLE 1

| Service Name | Service Operations | Operation Semantics |
| --- | --- | --- |
| Nnwdaf_MLModelProvision | Subscribe Unsubscribe Notify | Subscribe/Notify |
| Nnwdaf_MLModelInfo | Request | Request/Response |
| Nnwdaf_MLModelUpdate | Notify | Subscribe/Notify |
| Nnwdaf_MLModelTraining | Subscribe Unsubscribe Notify | Subscribe/Notify |
| Nnwdaf_MLModelTrainingInfo | Request | Request/Response |

In FL, the first NWDAF 510 may be an "FL consumer" NWDAF, the second NWDAF 530 may be an "FL server" NWDAF, and the third NWDAF 550 may be an "FL client" NWDAF. Hereinafter, a description of the "FL consumer" NWDAF, the "FL client" NWDAF, and the "FL server" NWDAF is provided.

An NWDAF (e.g., the first NWDAF 510, the second NWDAF 530, and/or the third NWDAF 550) including an MTLF may be registered to an NRF (e.g., the NRF 170 of FIG. 1). For example, the NWDAF including the MTLF may register their NF profile in an NRF. The NWDAF including the MTLF may include an "FL capability" registered in an NF profile registered in the NRF (e.g., the NRF 170).

The "FL capability" may indicate an FL server capability for a corresponding analytics ID and/or may indicate that the "FL client" capability is supported. In addition, the "FL capability" may indicate that an Nnwdaf_MLModelTraining service and/or an Nnwdaf_MLModelTrainingInfo service are supported (e.g., see FIGS. 6 and 7).

The "FL server" capability may be the capability of an MTLF to manage an FL operation (or task), select an FL client, aggregate ML models from other ML clients (e.g., an "FL consumer" NWDAF and/or an "FL client" NWDAF), send back trained ML model information to an FL client, and send back a model from the FL consumer when the accuracy of an ML model satisfies a predetermined condition.

The "FL client" capability may be the capability of an MTLF to perform ML model training on an ML model requested by an "FL server" using an available local database and local NFs and to report trained ML model information to the "FL server". The local database may be data allowed to be collected by an MTLF from other 5GS or an ADRF.

The "FL consumer" NWDAF (e.g., the first NWDAF 510) may be an NWDAF including an AnLF or an NWDAF including an MTLF. The "FL consumer" NWDAF may enable FL for an ML model (e.g., its own ML model and/or a downloaded (or received) ML model, and/or an ML model to be downloaded (or to be received)) by requesting the "FL server" NWDAF for FL.

The "FL server" NWDAF (e.g., the second NWDAF 530) may be an NWDAF including an MTLF, may support the "FL server" capability for a predetermined analytics ID, and may be selected to be an "FL server". The "FL server" NWDAF may be selected based on a local configuration of an administrator or may be selected by a consumer (or an analytics consumer or a service consumer) NWDAF for an analytics ID.

The "FL client" NWDAF (e.g., the third NWDAF 550) may be an NWDAF including an MTLF, may support an "FL client" function for a predetermined analytics ID, and may be selected as an FL client by the "FL server" NWDAF (e.g., the second NWDAF 530).

A case in which an "FL consumer" NWDAF is an NWDAF including an AnLF and discovers an MTLF for a trained ML model is described. When a trained ML model for a supported analytics ID does not exist, an NRF may select an NWDAF including an MTLF that supports an area of interest and an analytics ID for training an ML model. When a plurality of NWDAFs including an MTLF profile registered in the NRF supports requested ML model training, the NRF may set a priority to select an NWDAF including an MTLF that supports the "FL server" capability. The NRF may return a candidate for an instance of the NWDAF including the MTLF to the "FL consumer" NWDAF. The "FL consumer" NWDAF may select one NWDAF including the MTLF from a list (e.g., a candidate list) received from the NRF and may begin an ML model provisioning procedure. When an NWDAF including an MTLF selected by the "FL consumer" NWDAF supports the "FL server" capability for an analytics ID, the NWDAF including the MTLF may additionally determine whether to begin an FL procedure. When the NWDAF including the MTLF selected by the "FL consumer" NWDAF does not support the "FL server" capability, the NWDAF including the MTLF may perform ML model training and provision or may discover, through an NRF, an NWDAF including an MTLF supporting the "FL server" capability to trigger an FL operation.

When the "FL consumer" NWDAF is an NWDAF including an MTLF and determines an FL trigger due to internal logic (e.g., a lack of training data, excessive overhead of existing ML training, and the like), the "FL consumer" NWDAF may discover an NWDAF supporting the "FL server" capability through the NRF and may begin FL by invoking an Nnwdaf_MLModelTraining_Subscribe operation together with an indication of enabling FL and an initial ML model file address to the selected NWDAF (e.g., the "FL server" NWDAF).

The "FL server" NWDAF may select the "FL client" NWDAF from the NRF. The "FL server" NWDAF may additionally include the "FL client" capability as the "FL client" capability and the number of reported NWDAFs for the analytics ID in a discovery request message. The NRF may return candidates for instances of an NWDAF including an MTLF and each of the candidates for instances of the NWDAF including the MTLF may include an analytics ID, ML model filter information, and an "FL client" support for the analytics ID.

When the first NWDAF 510, which is the "FL consumer" NWDAF, requests the second NWDAF 530, which is the "FL server" NWDAF, for FL, a second NWDAF may support an "FL client" NWDAF search procedure and may support transmission of an FL request to the "FL client" NWDAF. In addition, the second NWDAF may support aggregation of intermediate training results from the "FL client" NWDAF.

The third NWDAF 550, which is the "FL client" NWDAF, may support local ML training based on the FL request transmitted from the second NWDAF 530, which is the "FL server" NWDAF, and may support to report a trained interim ML model to the third NWDAF 550.

Figure 6:
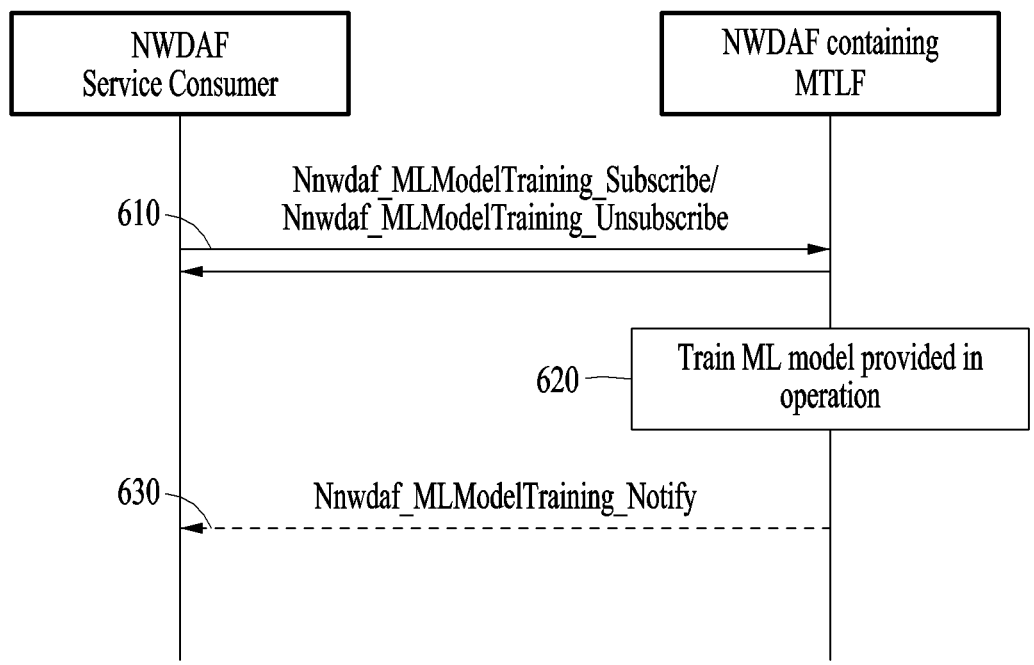
FIG. 6 is a diagram illustrating an example of a procedure of an ML model training, according to one embodiment.

FIG. 6 is a diagram illustrating an example of a procedure of an ML model training, according to one embodiment. An ML model training service of FIG. 6 may be for describing ML model training subscribe, unsubscribe, notify, update, and modify operations.

The procedure shown in FIG. 6 may be a procedure used by a service consumer NWDAF (e.g., an NWDAF including an MTLF) to subscribe to another NWDAF (e.g., an NWDAF including an MTLF) for a trained ML model based on an ML model provided by the service consumer NWDAF. The NWDAF including the MTLF may use a service to enable (e.g., activate) FL or update an ML model. In addition, the NWDAF may use a service for the NWDAF including the MTLF to prepare ML model training or request to modify subscription to existing ML model training.

In operation 610, an NWDAF service consumer may subscribe, unsubscribe, or modify a subscription to ML model training by invoking Nnwdaf_MLModelTraining_Subscribe or Nnwdaf_MLModelTraining_Unsubscribe operations. A parameter that may be provided by the NWDAF service consumer may be specified in the following input parameter part.

To enable (activate) FL, the NWDAF service consumer functioning as an FL server NWDAF may subscribe to a plurality of NWDAFs (e.g., an NWDAF including an MTLF and selected by an FL server NWDAF) functioning as FL client NWDAFs.

The FL server NWDAF may use a request to identify whether an NWDAF is able to satisfy an ML model training requirement (e.g., interoperability information, an analytics ID, a service region/data network access identifier (DNAI), and/or data and time availability). In this case, the FL server NWDAF may include an ML preparation flag in the request. When the ML preparation flag exists in the request, a service provider NWDAF may identify whether the ML model training requirement is satisfied or whether a model is able to be successfully downloaded when model information is provided.

The FL server NWDAF may use a request to import the model accuracy of a global ML model calculated by the FL client NWDAF. In this case, the service consumer NWDAF may include a model accuracy check flag in the request. When the model accuracy check flag exists in the request, the service provider NWDAF may calculate the model accuracy of an ML model provided by the service consumer NWDAF by using local training data as a test dataset.

When the NWDAF service consumer determines to additionally update an ML model, the NWDAF service consumer may modify a subscription by invoking an Nnwdaf_MLModelTraining_Subscribe service operation. The Nnwdaf_MLModelTraining_Subscribe service operation may include a subscription correlation ID and ML model information (e.g., a file address (e.g., a URL or a fully qualified domain name (FQDN)) of an ML model that requires to be updated).

In operation 620, the NWDAF including the MTLF may train a provided ML model by collecting new data or reusing data retained by the NWDAF.

In operation 630, the NWDAF including the MTLF completes ML model training, the NWDAF including the MTLF may notify the NWDAF service consumer of the ML model information (e.g., a file address (e.g., a URL or an FQDN) of the updated ML model) by invoking an Nnwdaf_MLModelTraining_Notify service operation. A parameter that the NWDAF including the MTLF is able to provide to the service provider may be specified in the following input parameter part.

When the NWDAF including the MTLF determines to terminate ML model training (e.g., when the NWDAF including the MTLF does not provide an additional notification related to the request), the NWDAF including the MTLF may notify the NWDAF service consumer of cause code (e.g., NWDAF overload, no longer available in the FL process, and the like) together with a terminate request indication by invoking an Nnwdaf_MLModelTraining_Notify service operation.

To enable (activate) FL, the NWDAF including the MTLF (e.g., functioning as an FL client) may notify the NWDAF server consumer functioning as the FL server of local ML model information and a status report of FL training. The local ML model information and the status report of FL training may include the accuracy of the local model and training input data information (e.g., a region covered by a dataset, a sampling ratio, maximum and minimum values of each dimension value, etc.).

When the model accuracy check flag exists in Nnwdaf_MLModelTraining_Subscribe, the service provider NWDAF functioning as the FL client NWDAF may notify the NWDAF service consumer functioning as the FL server NWDAF of the model accuracy of the global ML model.

Input Parameters of ML Model Training Service

A consumer (e.g., an NWDAF including an MTLF) of the ML model training service may provide input parameters in the request as follows:

Analytics ID: use to identify analytics information generated by a provided ML model ML model interoperability information: information for identifying whether interoperability is supported between a model training service consumer and a model training service provider Notification target address (+notification correlation ID): correlate a subscription with a notification received by an NWDAF including an MTLF

[Optional] ML model information (an address (e.g., a URL or an FQDN) of a model file)

[Optional] ML model ID: identify a provided ML model

[Optional] ML preparation flag: identify that the request is for preparing FL

[Optional] ML model accuracy check flag: identify that the request is for calculating the model accuracy of a global ML model provided by a service consumer NWDAF that functions as an FL server NWDAF by using local training data as a test dataset

[Optional] ML correlation ID: an ID for identifying requested ML model training when multiple ML model trainings exist. This parameter may be included when a service is used for FL.

[Optional] Available data requirement. This may be for notifying of a requirement of data that may be used for ML model training. For example, an FL server NWDAF may transmit a requirement in a preparation request to an FL client NWDAF to select an FL client NWDAF that is able to satisfy an available data requirement.

[Optional] Availability time requirement. This may be for notifying of an available time requirement for ML model training. For example, an FL server NWDAF may transmit a requirement in a preparation request to an FL client NWDAF to select an available FL client NWDAF within the time required for ML model training.

[Optional] Training filter information: allow to select data (e.g., S-NSSAI, an area of interest) requested for ML model training. A parameter type of training filter information may be the same as or a subset of the parameter type of ML model filter information provided through operation 805 of FIG. 8 or operation 903 of FIG. 9.

[Optional] Target of training report: represent an object (e.g., an UE group or all UE) to which data is requested for ML model training

[Optional] Use case context: information for identifying a use case using analytics information generated by the ML model. The use case context may be set in advance by a business entity.

[Optional] Training reporting information, including the following parameters:

Maximum response time: indicate the maximum time of waiting notifications (e.g., a training result)

[Optional] Expiry time: indicate the time when the subscription expires

Output Information of ML Model Training Service

An NWDAF including an MTLF may provide the following output information in a notification to a consumer of the ML model training service operation.

Notification correlation information

ML model information (an address (e.g., a URL or an FQDN) of a model file): information on an updated ML model

[Optional] ML model ID: identify an ML model indicated by the ML model information

[Optional] Model accuracy: model accuracy of the global ML model. The model accuracy is calculated by an FL client NWDAF using local training data as a test dataset.

[Optional] Training input data information (e.g., an area, a sampling ratio, and maximum and minimum values of each dimension value of the data)

[Optional] ML correlation ID. This parameter may be included when a service is used for FL.

Nnwdaf_MLModelTraining Service

A consumer may subscribe, unsubscribe, notify, or modify ML model training through this service.

When the service is used for FL, the FL server NWDAF may enable (activate) FL through this service while providing the global ML model information to the FL client NWDAF and obtaining the local ML model information of FL training and the status report from the FL client NWDAF.

Nnwdaf_MLModelTraining_Subscribe Service Operation

This operation may allow to subscribe to NWDAF ML model training using a predetermined parameter.

Inputs, Required:
Analytics ID
Interoperability information;
Notification target address (+Notification correlation ID);

Inputs, Optional:
ML model ID: identify a provided ML model
ML model information (a file address of an ML model that requires to be updated (e.g., a URL or an FQDN));
Subscription correlation ID (when modifying a subscription to ML model training);
ML training information (e.g., a data availability requirement, a time availability requirement)
ML preparation flag;
ML model accuracy check flag;
ML correlation ID;
Training filter information;
Target of training reporting;
Training reporting information;
Use case context;
Expiry time.

Outputs, Required: If a request is accepted, a subscription correlation ID (required to manage a subscription). If the request is not accepted, an error response including cause code (e.g., an NWDAF does not satisfy an ML training requirement).

Outputs, Optional: ML correlation ID (e.g., check a subscription to this FL procedure).

Nnwdaf_MLModelTraining_Notify Service Operation

An NWDAF may notify a consumer instance of a trained ML model that subscribes to a predetermined NWDAF service. In addition, the NWDAF may notify the consumer that ML model training is terminated by using this service.

Inputs, Required:
Notification correlation information: This parameter may indicate a notification correlation ID assigned to a consumer during ML model training;
Set of the tuple (e.g., an analytics ID, ML model information (e.g., a file address of an updated ML model (e.g., a URL or an FQDN))).

Inputs, Optional:
In the case of FL, ML correlation ID;
Corresponding use case context;
Termination request: This parameter indicates that an NWDAF requests to terminate ML model training. The NWDAF may not provide an additional notification related to this request and may provide cause code (e.g., NWDAF overload, no longer available for an FL process, and the like);
ML Model ID: This parameter identifies a provisioned ML model;
ML model accuracy: model accuracy of the global ML model. The model accuracy is calculated by an FL client NWDAF using local training data as a test dataset.
Status report of FL training: the accuracy of a local model and training input data information (e.g., an area included in a dataset, a sampling ratio, maximum and minimum values of each dimension value, and the like). The status report is generated by an FL client NWDAF during the FL procedure.

Delay event notification: This parameter indicates that an NWDAF fails to complete training of an interim local ML model within the maximum response time provided by a consumer, together with cause code (e.g., fails to train a local ML model, requires more time to train the local ML model, and the like).

Outputs, Required: operation execution result indication.

Outputs, Optional: none

Figure 7:
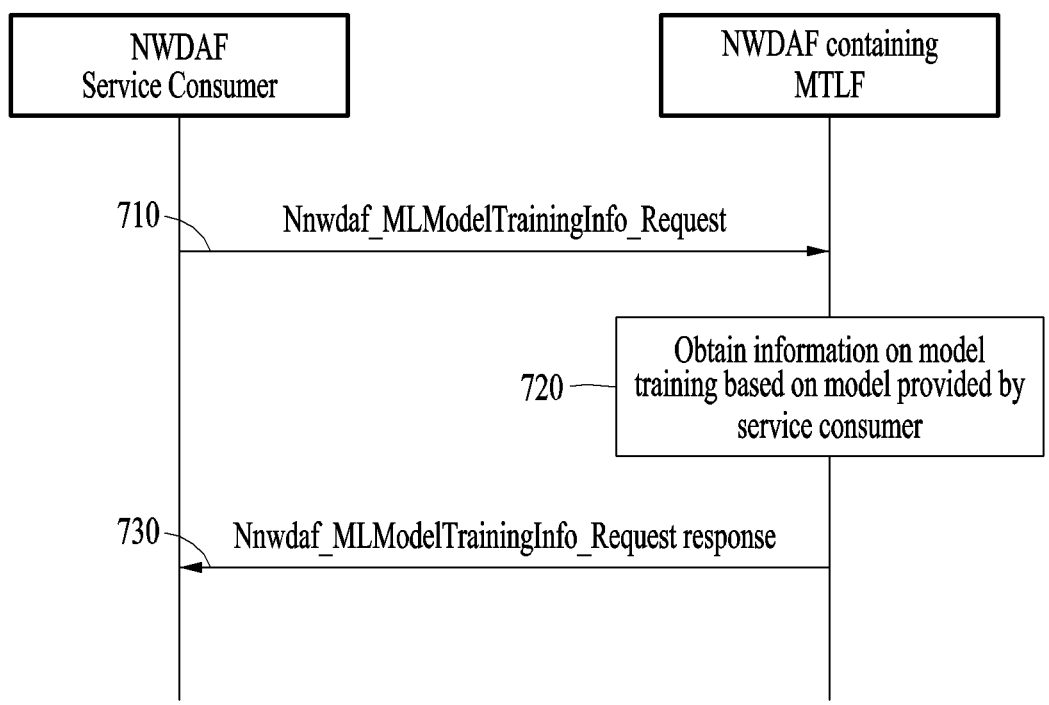
FIG. 7 is a diagram illustrating another example of a procedure of an ML model training according to one embodiment.

FIG. 7 is a diagram illustrating another example of a procedure of an ML model training according to one embodiment. An ML model training service of FIG. 7 may be to describe an ML model training information request operation.

The procedure shown in FIG. 7 may be a procedure used by an NWDAF service consumer (e.g., an NWDAF including an MTLF) to request another NWDAF (e.g., an NWDAF including an MTLF) for information on a trained ML model based on an ML model provided by a service consumer.

In operation 710, an NWDAF service consumer may request an NWDAF including an MTLF to obtain information on a trained ML model based on an ML model provided by a service consumer by invoking an Nnwdaf_MLModel-TrainingInfo_Request service operation.

A parameter that may be provided by the NWDAF service consumer may be specified in the input parameter part described with reference to FIG. 6.

To enable (activate) FL, the NWDAF service consumer functioning as an FL server NWDAF may request an NWDAF (e.g., an NWDAF including an MTLF and selected by the FL server NWDAF) functioning as an FL client NWDAF to fetch ML model training information.

The NWDAF service consumer may use a request to identify whether an NWDAF is able to satisfy an ML model training requirement (e.g., interoperability information, an analytics ID, a service region/DNAI, and/or data and time availability). In this case, the NWDAF service consumer may include an ML preparation flag in the request.

The NWDAF service consumer may use the request to obtain the model accuracy of an ML model provided by a service consumer using local training data in the NWDAF including the MTLF as a test dataset. In this case, the service consumer NWDAF may include a model accuracy check flag in the request.

In operation 720, when the ML preparation flag exists in the request, the NWDAF including the MTLF may identify whether the ML model training requirement is satisfied or whether a model is able to be successfully downloaded when model information is provided. Based on an identification result, the NWDAF including the MTLF may obtain successful return code or failure cause code (e.g., the NWDAF does not satisfy the ML training requirement) as information on ML model training.

When the model accuracy check flag exists in the request, the NWDAF including the MTLF may calculate the model accuracy of an ML model provided by the service consumer NWDAF by using local training data as a test dataset. The NWDAF including the MTLF may include the model accuracy in the information on ML model training.

When the NWDAF including the MTLF is in progress of ML model training based on the ML model provided by the service consumer, the NWDAF including the MTLF may obtain failure cause code (e.g., ML training is not completed) as the information on ML model training.

When the NWDAF including the MTLF completes ML model training based on the ML model provided by the service consumer, the NWDAF including the MTLF may obtain successful return code of the ML model and the ML model information as the information on ML model training.

In operation 730, the NWDAF including the MTLF may respond to the NWDAF service consumer with the information on ML model training by invoking an Nnwdaf_MLModelTrainingInfo_Request response service operation.

Nnwdaf_MLModelTrainingInfo Service

This may be a service for a consumer to request for information on an ML model that is trained based on an ML model provided by the consumer.

When the service is used for FL, an FL server NWDAF may enable (activate) FL through this service while providing global ML model information to an FL client NWDAF and obtaining local ML model information.

Nnwdaf_MLModelTrainingInfo_Request Service Operation

This service operation may allow a consumer to request for information on NWDAF ML model training using a predetermined parameter.

Inputs, required:
Analytics ID;
Interoperability information;
ML model ID: identify a provided ML model Inputs, Optional:
ML model information (a file address of an ML model that requires to be updated (e.g., a URL or an FQDN));
ML training information (e.g., a data availability requirement, a time availability requirement)
ML preparation flag;
ML model accuracy check flag;
ML correlation ID;
Correlation termination flag (e.g., use to terminate FL identified by an ML correlation ID);
Training filter information;
Use case context;

Outputs, Required: When the request is accepted: Operation execution result indication. When the request is not accepted, an error response with cause code (e.g., NWDAF does not meet the ML training requirements, ML training is not complete, NWDAF overload, not available for the FL process anymore, etc.).

Outputs, Optional:
ML model ID.
Set of the tuple (e.g., an analytics ID, ML model information (e.g., a file address of an updated ML model (e.g., a URL or an FQDN))).
In the case of FL, ML correlation ID;
Corresponding use case context;
ML model accuracy;
Characteristic of local training dataset (e.g., in the case of a data availability requirement).

Figure 8:
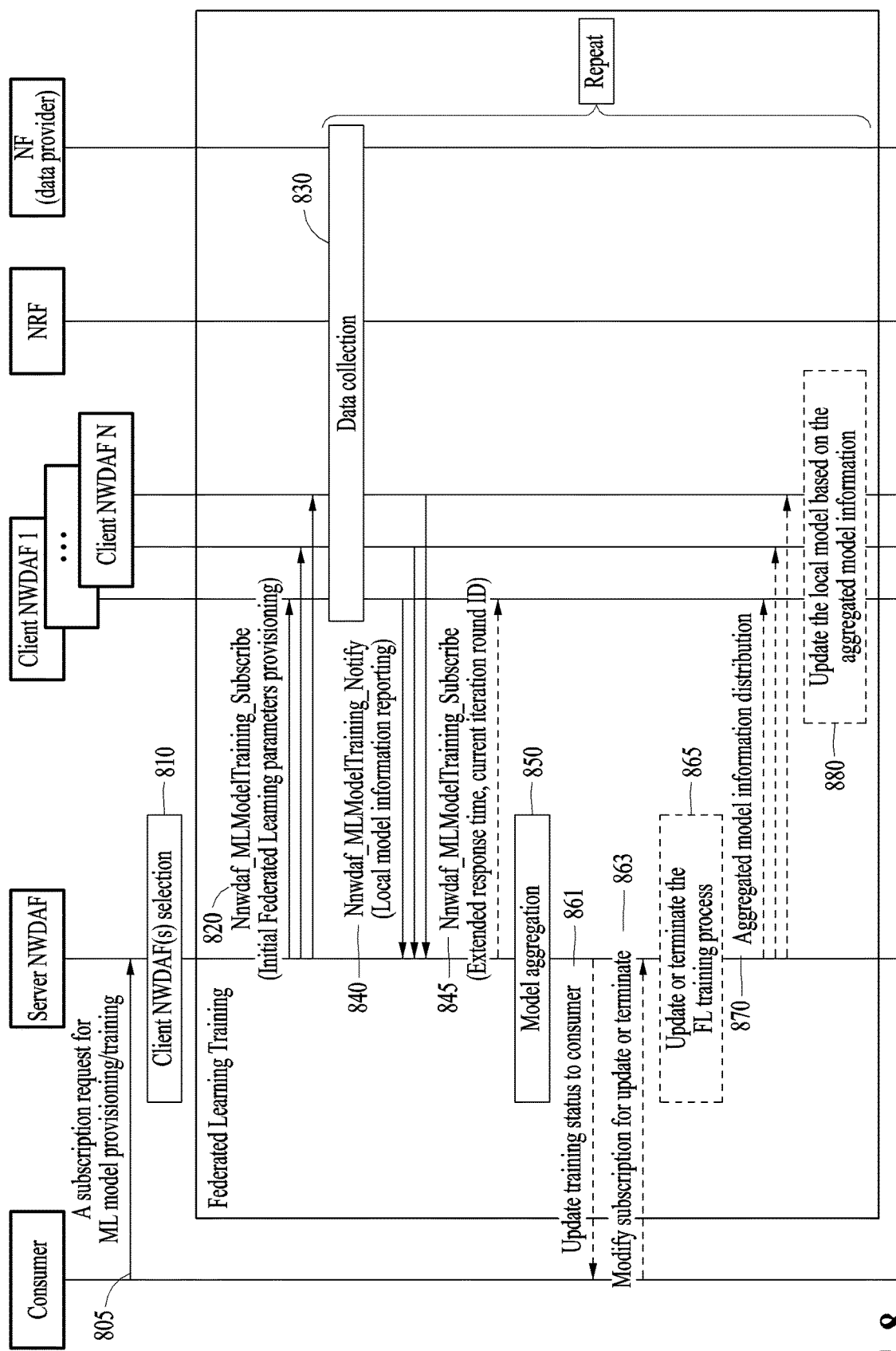
FIG. 8 is a diagram illustrating an example of an FL operation procedure between different NWDAFs according to one embodiment.

FIG. 8 is a diagram illustrating an example of an FL operation procedure between different NWDAFs according to one embodiment.

In operation 805, a consumer (e.g., an NWDAF including an AnLF or an NWDAF including an MTLF) may transmit a subscription request to an NWDAF including an MTLF to retrieve or train an ML model. For the subscription request, the consumer may use an Nnwdaf_MLModelProvision service (e.g., when the consumer is an NWDAF including an AnLF) including an analytics ID and an ML model metric or an Nnwdaf_MLModelTraining_Subscribe service (e.g., when the consumer is an NWDAF including an MTLF) or an Nnwdaf_MLModelTrainingInfo_Request (e.g., when the consumer is an NWDAF including an MTLF). The ML model metric may include ML model accuracy/precision/ recall, an accuracy reporting interval, and/or a predetermined status (e.g., an ML model accuracy threshold, a total training time). The ML model accuracy threshold may be used to indicate the target ML model accuracy of a training process, and the FL server NWDAF may stop the training process when reaching the ML model accuracy threshold during the training process.

When a consumer (e.g., an NWDAF including an AnLF) provides the time required by an ML model, the FL server NWDAF may determine the maximum response time of an FL client NWDAF by considering corresponding information (e.g., the time required by the ML model).

In operation 810, the FL server NWDAF including the MTLF may select an NWDAF including an MTLF (e.g., an FL client NWDAF).

In operation 820, the FL server NWDAF may transmit Nnwdaf_MLModelTraining_Subscribe or Nnwdaf_MLModelTrainingInfo_Request to the selected NWDAF (e.g., an FL client NWDAF, an NWDAF including an MTLF) that participates in FL to perform local model training based on an input parameter included in the request of the FL server NWDAF. Nnwdaf_MLModelTraining_Subscribe or Nnwdaf_MLModelTrainingInfo_Request may include a model metric (e.g., an ML model metric). The request (e.g., Nnwdaf_MLModelTraining_Subscribe or Nnwdaf_MLModelTrainingInfo_Request) may include the maximum response time in which the FL client NWDAF needs to report interim local ML model information to the FL server NWDAF.

In operation 830, each FL client NWDAF may collect local data.

In operation 840, during the FL training procedure, each FL client NWDAF may train an ML model provided by the FL server NWDAF based on their own data and may report interim local ML model information to the FL server NWDAF through Nnwdaf_MLModelTraining_Notify or Nnwdaf_MLModelTrainingInfo_Response. Nnwdaf_MLModelTraining_Notify or Nnwdaf_MLModelTrainingInfo_Response may include the interim local ML model information. In addition, Nnwdaf_MLModelTraining_Notify or Nnwdaf_MLModelTrainingInfo_Response may include a local ML model metric (e.g., computed by the FL client NWDAF) and information on local training in the FL client NWDAF (e.g., a characteristic of a local training dataset (e.g., an area, a sampling ratio, maximum and minimum values of each dimension value of data)). A parameter of the local training dataset may vary depending on the implementation.

During the FL training process, an ML model (e.g., an interim ML model) transmitted from the FL client NWDAF to the FL server NWDAF may be information required by the FL server NWDAF to build an aggregated model based on a locally trained ML model.

When the FL client NWDAF fails to complete training of an interim local ML model within the maximum response time provided by the FL server NWDAF, the FL client NWDAF may notify the FL server NWDAF of a delay event including information of an appropriate cause (e.g., failure of local ML model training, addition to the time required for local ML model training) and an estimated time to complete training if available before the maximum response time lapses.

(Optional) In operation 845, when the FL client NWDAF receives a notification that training may not be completed within the maximum response time, the FL server NWDAF may extend and transmit the maximum response time to the FL client NWDAF. Otherwise, the FL server NWDAF may instruct the FL client NWDAF to skip reporting on this iteration. The extended maximum response time may be included in Nnwdaf_MLModelTraining_Subscribe or Nnwdaf_MLModelTrainingInfo_Request and may be transmitted to the FL client NWDAF. The FL client NWDAF may report interim local ML model information to the FL server NWDAF beforehand (e.g., before extending and transmitting the maximum response time).

The FL server NWDAF may include a current iteration round ID in a message to indicate a request to modify a training parameter of the current iteration round.

In operation 850, the FL server NWDAF may update a global ML model by aggregating all pieces of local ML model information retrieved in operation 840. In addition, the FL server NWDAF may compute a global model metric based on the local model metric or may compute the global model metric by applying (e.g., if available) a global model to a validation dataset. The FL server NWDAF may update the global ML model whenever the FL client NWDAF provides updated local ML model information as a part of FL or may determine to wait for local ML model information of all FL client NWDAFs before updating the global ML model.

When the FL server NWDAF provides the maximum response time (e.g., operation 810) required to provide the interim local ML model information or the extended maximum response time (e.g., operation 845), the FL server NWDAF may determine whether to wait for an FL client NWDAF that has not yet provided an interim ML model within the maximum response time (e.g., the maximum response time of operation 810 and/or that of operation 845) or whether to update the global ML model by aggregating retrieved local ML model information instances. The FL server NWDAF may make this determination by considering a notification or a response of the FL client NWDAF, or when the FL server NWDAF does not receive a notification, the FL server NWDAF may make this determination based on a local configuration.

(Conditional) In operation 861, in response to the consumer request of operation 805, the FL server NWDAF may transmit an Nnwdaf_MLModelProvision_Notify message or an Nnwdaf_MLModelTraining_Notify service or Nnwdaf_MLModelTrainingInfo_Response to the consumer periodically (e.g., the number of predetermined training rounds or every 10 minutes) or when reaching a predetermined status (e.g., reaching the ML model accuracy threshold or expiration of training time) to dynamically update the global model metric.

(Conditional) In operation 863, the consumer may determine whether a current model is able to satisfy a requirement (e.g., whether the global model metric is satisfactory to the consumer) and may determine whether to stop or continue the training process. The consumer may stop or continue the training process by invoking the same service operation (e.g., Nnwdaf_MLModelProvision_Subscribe, Nnwdaf_MLModelTraining_Subscribe or Nnwdaf_MLModelTrainingInfo_Request) used in operation 805 again.

(Conditional) In operation 865, the FL server NWDAF may update or terminate the current FL training process based on the subscription request transmitted by the consumer in operation 863.

When the FL server NWDAF receives the request to stop an FL training process in operation 863, operations 870 and 880 may be skipped.

In operation 870, when the FL procedure continues, the FL server NWDAF may determine an FL client NWDAF and may transmit Nnwdaf_MLModelTraining_Subscribe or Nnwdaf_MLModelTrainingInfo_Request to the selected FL client NWDAF for the following FL training round. In this case, Nnwdaf_MLModelTraining_Subscribe or Nnwdaf_MLModelTrainingInfo_Request may include aggregated ML model information.

In operation 880, each FL client NWDAF may use aggregated ML model information distributed by the FL server NWDAF in operation 870 as their own ML model or may update their own ML model.

Operations 830 to 880 may be iterated until reaching a training termination condition (e.g., the maximum number of iterations, a condition in which a result of a loss function is less than a threshold).

When the FL procedure is completed, the FL server NWDAF may request the FL client NWDAF for termination of the FL procedure by invoking an Nnwdaf_MLModel-Training_Unsubscribe service including cause code that the FL procedure is terminated. The Nnwdaf_MLModelTraining_Unsubscribe service may further selectively include final aggregated ML model information. The FL client NWDAF may terminate local model training, and when the final aggregated ML model information is received from the FL server NWDAF, the FL client NWDAF may store and use the final aggregated ML model information.

After the training procedure is completed, the FL server NWDAF may transmit Nnwdaf_MLModelProvision_Notify, Nnwdaf_MLModelTraining_Notify service, or Nnwdaf_MLModelTrainingInfo_Response including globally optimal ML model information to the consumer.

Figure 9:
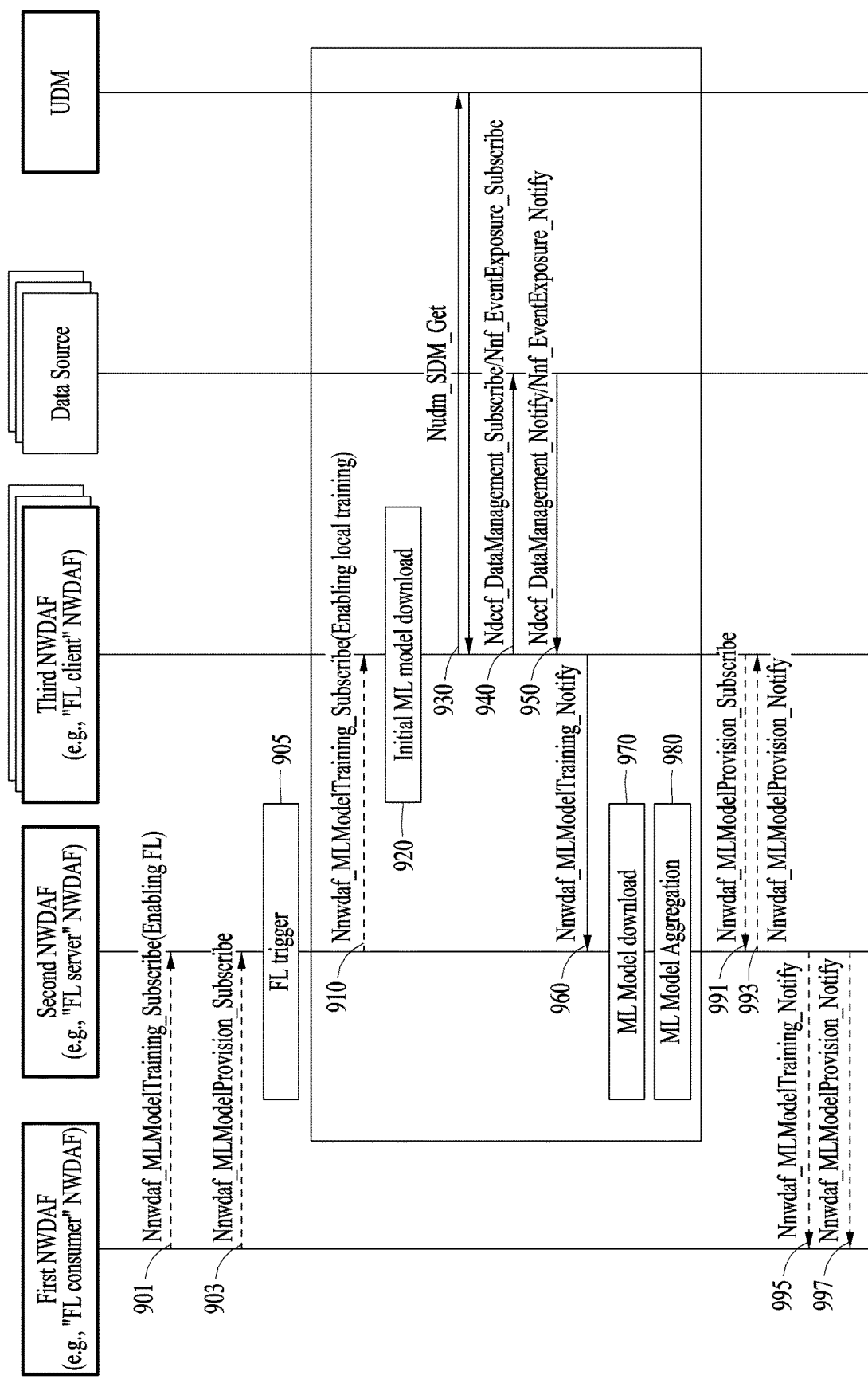
FIG. 9 is a diagram illustrating another example of an FL operation procedure between different NWDAFs according to one embodiment.

FIG. 9 is a diagram illustrating another example of an FL operation procedure between different NWDAFs according to one embodiment.

In FIG. 9, a first NWDAF may be an "FL consumer", a second NWDAF may be an "FL server", and a third NWDAF may be an "FL client".

In operation 901, when the first NWDAF (e.g., the "FL consumer" NWDAF) is an NWDAF including an MTLF without the "FL server" capability and determines to trigger FL from the internal logic, the first NWDAF may search for and select the second NWDAF (e.g., the "FL server" NWDAF) from an NRF (e.g., the NRF 170 of FIG. 1) and may subscribe an Nnwdaf_MLModelTraining_Subscribe service to the second NWDAF with an indication of "enabling FL" and a file address of an ML model to train.

In operation 903, when the first NWDAF is an NWDAF including an AnLF, the first NWDAF may search for and select the second NWDAF through the NRF and may subscribe to an Nnwdaf_MLModelProvsion_Subscribe service to the second NWDAF.

In operation 905, an FL operation may be triggered by a local configuration in the second NWDAF or a request (e.g., a request of the first NWDAF in operation 901 or 903) of the first NWDAF. In operation 903, when the Nnwdaf_MLModelProvision_Subscribe operation is triggered, the second NWDAF may determine whether the FL operation is required based on an area of interest, ML model reporting information, an expiry time, and a local operator configuration.

The second NWDAF may be an "FL server" NWDAF and may consist of initial FL parameters corresponding to an analytics ID. The initial FL parameters may include the number of FL rounds, the total number of FL clients used in a process (e.g., an FL process), and an area of interest for an analytics ID (e.g., the area of interest may be a public land mobile network (PLMN) or a registration area list).

For initial ML model training, pre-configured initial FL parameters may be used. The ML model may be re-trained to improve the correctness of an NWDAF analysis and an FL parameter used for re-training may be different from the pre-configured initial FL parameter.

In operation 910, in response to the FL operation trigger, the second NWDAF may select a third NWDAF for a predetermined analytics ID in an area of interest. The second NWDAF may transmit Nnwdaf_MLModelTraining_Subscribe together with additional FL parameters (e.g., additional parameters for FL) to the third NWDAF.

The additional FL parameters may include an ML ID and/or ML model information (e.g., including a file address (or a set of file addresses) of a trained ML model) for requesting an ML model operation. The additional FL parameters may include an indication for enabling local training. In the ML ID, for each ML model FL operation, the second NWDAF may assign different ML IDs to the third NWDAFs. The second NWDAF may identify interim ML models (or temporary ML model) received from the third NWDAFs by analytics IDs and ML IDs. The ML ID may not be updated during the FL operation procedure.

In operation 920, the third NWDAF may download an ML model based on ML model information (e.g., the ML model information received in operation 910).

In operation 930, when a UE-related parameter is required for ML training (e.g., local ML model training), a user's consent may be performed by the third NWDAF.

In operations 940 and 950, the third NWDAF may collect data from a data source (e.g., other available 5GSs (e.g., an AMF, an SMF) or DCCF) for local ML model training. In operation 940, the third NWDAF may request the data source for data. In operation 950, the data source may transmit the data to the third NWDAF.

In operation 960, the third NWDAF may perform local ML model training and may transmit a trained interim ML model to the second NWDAF through Nnwdaf_MLModelTraining_Notify. Information (e.g., an analytics ID, an FL ID, a file address of a learning result, and ML model filter information) of an interim ML model trained by the third NWDAF may be included in a notification message (e.g., a notification message of Nnwdaf_MLModelTraining_Notify).

In operation 970, the second NWDAF may download an interim ML model (e.g., identified by an analytics ID and an FL ID) trained by the third NWDAF based on the interim ML model information (e.g., the interim ML model information received in operation 960).

In operation 980, the second NWDAF may aggregate ML models for the same analytics ID. The second NWDAF may aggregate locally trained ML models by the third NWDAF for the same analytics ID. The second NWDAF may globally update the ML model for the same analytics ID. After the second NWDAF aggregates and processes (e.g., average and/or weighted average) locally trained ML models via the third NWDAF, for example, local training results (e.g., gradients of ML models), the second NWDAF may change an ML model by reflecting a processing result (e.g., an average of gradients and/or a weighted average value) in the ML model.

Operations 910 to 980 may be iterated to support iterative training based on FL parameters constructed for an analytics ID. For example, after operation 980 for the first training round, the second NWDAF may begin operation 910 for second training. Operation 930 for checking the use consent may be performed only in the first round of iterative training.

In operations 991 and 993, the third NWDAF may subscribe to an ML model that is FL trained for the analytics ID (e.g., an aggregated ML model (e.g., an updated ML model) in operation 980) from the second NWDAF.

In operation 995, the second NWDAF may provide an ML model trained by FL to the first NWDAF by invoking an "Nnwdaf_MLModelTraining_Notify" service operation in response to the request in operation 901.

In operation 997, the second NWDAF may provide an ML model trained by FL to the first NWDAF by invoking an "Nnwdaf_MLModelProvision_Notify" service operation in response to the request of operation 903.

Figure 10:
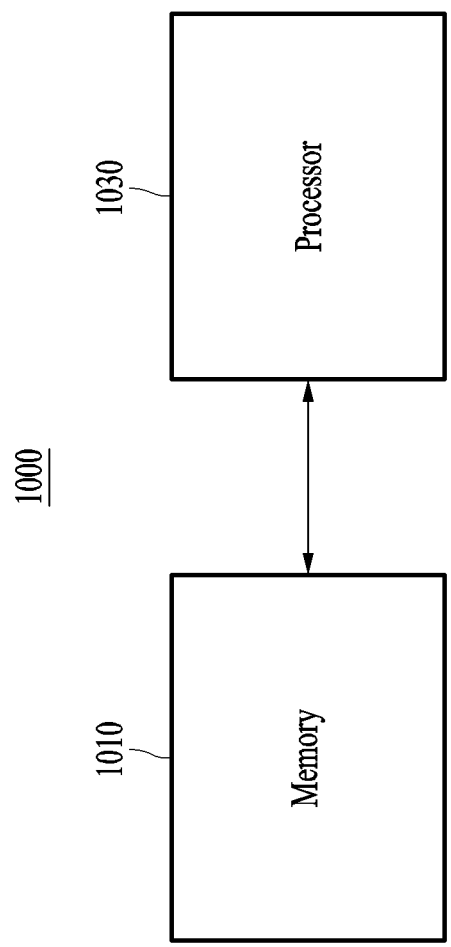
FIG. 10 is a schematic block diagram of an apparatus for performing an NWDAF according to one embodiment.

FIG. 10 is a schematic block diagram of an apparatus for performing an NWDAF according to one embodiment.

Referring to FIG. 10, according to one embodiment, an apparatus 1000 for performing an NWDAF (e.g., a server apparatus) may be substantially the same as the NWDAF (e.g., an "FL consumer" NWDAF, an "FL server" NWDAF, or an "FL client" NWDAF) described with reference to FIGS. 1 to 9. The apparatus 1000 may include a memory 1010 and a processor 1030. The apparatus 1000 may operate as an "FL consumer" NWDAF, an "FL server" NWDAF, or an "FL client" NWDAF.

The memory 1010 may store instructions (or programs) executable by the processor 1030. For example, the instructions include instructions for performing an operation of the processor 1030 and/or an operation of each component of the processor 1030.

The memory 1010 may be implemented as a volatile or non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (Fe-RAM), phase change RAM (PRAM), resistive RAM (RRAM), nanotube RRAM, polymer RAM (PoRAM), nano floating gate Memory (NFGM), holographic memory, a molecular electronic memory device, and/or insulator resistance change memory.

The processor 1030 may execute computer-readable code (e.g., software) stored in the memory 1010 and instructions triggered by the processor 1030. The processor 1030 may be a data processing device implemented by hardware including a circuit having a physical structure to perform desired operations. The desired operations may include code or instructions in a program. For example, the hardware-implemented data processing device may include a microprocessor, a CPU, a processor core, a multi-core processor, a multiprocessor, an ASIC, and a FPGA.

An operation performed by the processor 1030 may be substantially the same as operations of an NWDAF (e.g., an "FL consumer" NWDAF, an "FL server" NWDAF, or an "FL client" NWDAF) described with reference to FIGS. 1 to 9. Accordingly, a detailed description thereof is omitted.

The components described in the example embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component, and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software art. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operating method of a federation learning (FL) server, the method comprising:
performing an FL operation trigger in response to a request of a first network function (NF); and
in response to the FL operation trigger:
selecting a plurality of second NFs on an analytics identifier (ID);
requesting the plurality of second NFs for FL,
receiving one or more trained interim machine learning (ML) models from the plurality of second NFs,
aggregating the trained interim ML models from the plurality of second NFs to produce a trained ML model, and
providing the trained ML model to the first NF,
wherein the first NF is an FL consumer, and
wherein the plurality of second NFs includes an FL client and does not include the first NF.

2. The method of claim 1, wherein the FL server and the plurality of second NFs comprise an FL capability, and
the FL capability indicates that at least one of an FL server capability and an FL client capability is supported for a corresponding analytics ID.

3. The method of claim 1, wherein, when the first NF is a network data analytics function (NWDAF) comprising a model training logical function (MTLF), a request of the first NF is performed as an Nnwdaf_MLModelTraining_Subscribe service, and
when the first NF is an NWDAF comprising an analytic logical function (AnLF), a request of the first NF is performed as an Nnwdaf_MLModelProvsion_Subscribe service.

4. The method of claim 1, wherein the requesting for FL comprises:
transmitting, to the plurality of second NFs, second FL parameters, which are different from first FL parameters, by the FL server comprising the first FL parameters.

5. The method of claim 4, wherein the first FL parameters comprise a number of FL rounds, a total number of FL clients used in a process, and an area of interest for an analytics ID.

6. The method of claim 4, wherein the second FL parameters comprise a machine learning (ML) identifier, an indication for enabling local training, or ML model information for requesting an ML model operation.

7. The method of claim 6, wherein different ML IDs are assigned to the plurality of second NFs, respectively.

8. The method of claim 1, wherein the interim ML models are identified by an analytics ID and machine learning (ML) IDs respectively assigned to the plurality of second NFs.

9. The method of claim 1, further comprising:
determining whether an FL operation is required based on an area of interest, machine learning (ML) model reporting information, an expiry time, and a local operator configuration.

10. A federation learning (FL) server apparatus comprising:
a processor; and
a memory electrically connected to the processor and configured to store instructions executable by the processor,
wherein the processor performs a plurality of operations when the instructions are executed by the processor, the plurality of operations comprising:
performing an FL operation trigger in response to a request of a first network function (NF);
in response to the FL operation trigger:
selecting a plurality of second NFs on an analytics identifier (ID) in response to the FL operation trigger;
requesting the plurality of second NFs for FL;
receiving one or more trained interim machine learning (ML) models from the plurality of second NFs,
aggregating the trained interim ML models from the plurality of second NFs to produce a trained ML model, and
providing the trained ML model to the first NE,
wherein the first NF is an FL consumer, and
wherein the plurality of second NFs includes an FL client and does not include the first NF.

11. The FL server apparatus of claim 10, wherein the FL server apparatus and the plurality of second NFs comprise an FL capability, and
the FL capability indicates that at least one of an FL server capability and an FL client capability is supported for a corresponding analytics ID.

12. The FL server apparatus of claim 10, wherein, when the first NF is a network data analytics function (NWDAF) comprising a model training logical function (MTLF), a request of the first NF is performed as an Nnwdaf_MLModelTraining_Subscribe service, and
when the first NF is an NWDAF comprising an analytic logical function (AnLF), a request of the first NF is performed as an Nnwdaf_MLModelProvsion_Subscribe service.

13. The FL server apparatus of claim 10, wherein the requesting for FL comprises:
transmitting, to the plurality of second NFs, second FL parameters, which are different from FL parameters, by the FL server apparatus comprising the first FL parameters.

14. The FL server apparatus of claim 13, wherein the first FL parameters comprise a number of FL rounds, a total number of FL clients used in a process, and an area of interest for an analytics ID.

15. The FL server apparatus of claim 13, wherein the second FL parameters comprise a machine learning (ML) identifier, an indication for enabling local training, or ML model information for requesting an ML model operation.

16. The FL server apparatus of claim 15, wherein different ML IDs are assigned to the plurality of second NFs, respectively.

17. The FL server apparatus of claim 11, wherein the interim ML models are identified by an analytics ID and the ML IDs respectively assigned to the plurality of second NFs.

18. The FL server apparatus of claim 10, wherein the plurality of operations further comprises:
determining whether an FL operation is required based on an area of interest, machine learning (ML) model reporting information, an expiry time, and a local operator configuration.

* * * * *